United States Patent
Yamaguchi

(10) Patent No.: US 7,734,072 B2
(45) Date of Patent: Jun. 8, 2010

(54) FACE RECOGNITION FOR AUTOMATIC ADJUSTMENT OF PERSONALIZED DEVICE PARAMETERS

(75) Inventor: Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 906 days.

(21) Appl. No.: 11/363,744

(22) Filed: Feb. 28, 2006

(65) Prior Publication Data

US 2006/0193502 A1    Aug. 31, 2006

(30) Foreign Application Priority Data

Feb. 28, 2005    (JP)    ............... 2005-055149

(51) Int. Cl.
*G06K 9/00*    (2006.01)
(52) U.S. Cl. .............. 382/118; 340/5.53; 340/5.83
(58) Field of Classification Search .............. 382/118; 340/5.5–5.53, 5.8–5.84
See application file for complete search history.

(56) References Cited

U.S. PATENT DOCUMENTS

| | | | | |
|---|---|---|---|---|
| 5,608,387 | A * | 3/1997 | Davies ...................... | 340/5.27 |
| 5,699,449 | A * | 12/1997 | Javidi ......................... | 382/156 |
| 5,982,912 | A | 11/1999 | Fukui et al. | |
| 6,122,580 | A * | 9/2000 | Autermann ................. | 701/49 |
| 6,198,996 | B1 * | 3/2001 | Berstis ........................ | 701/36 |
| 6,724,919 | B1 * | 4/2004 | Akiyama et al. ............ | 382/118 |
| 7,039,221 | B1 * | 5/2006 | Tumey et al. ............... | 382/118 |
| 7,134,130 | B1 * | 11/2006 | Thomas ....................... | 725/25 |
| 7,142,696 | B1 * | 11/2006 | Engelsberg et al. ......... | 382/118 |
| 2002/0191817 | A1 * | 12/2002 | Sato et al. ................... | 382/118 |
| 2003/0007685 | A1 * | 1/2003 | Tsai et al. ................... | 382/167 |
| 2003/0039380 | A1 * | 2/2003 | Sukegawa et al. .......... | 382/118 |
| 2003/0083938 | A1 * | 5/2003 | Smith et al. ................. | 705/14 |
| 2004/0234109 | A1 * | 11/2004 | Lemelson et al. ........... | 382/118 |

FOREIGN PATENT DOCUMENTS

| | | |
|---|---|---|
| JP | 08-320677 | 12/1996 |
| JP | 2002-288670 | 10/2002 |
| JP | 2004-054580 | 2/2004 |
| JP | 3590285 | 8/2004 |

OTHER PUBLICATIONS

U.S. Appl. No. 09/003,638.

* cited by examiner

*Primary Examiner*—Brian P Werner
*Assistant Examiner*—Barry Drennan
(74) *Attorney, Agent, or Firm*—Turocy & Watson, LLP

(57) ABSTRACT

This is a system having a personal identification function to perform a registering operation not as an explicit one. The system simplifies the confirmation of an identification result thereby to improve dictionary updating conveniences. A device control apparatus is configured to include a face identification processor, a device setting unit and an interactive processor. The device control apparatus is configured to acquire personal data on the face image of a user, to identify a person matching the acquired personal data, by comparing the acquired personal data and registered personal dictionary data, to display the face image, as matching the identified person, at the registration time on the basis of the registered personal dictionary data, to receive such confirmation information from the user as to confirm whether or not the displayed person is identical to the user, and to set device environment parameters matching the confirmed person.

3 Claims, 8 Drawing Sheets

FIG. 3
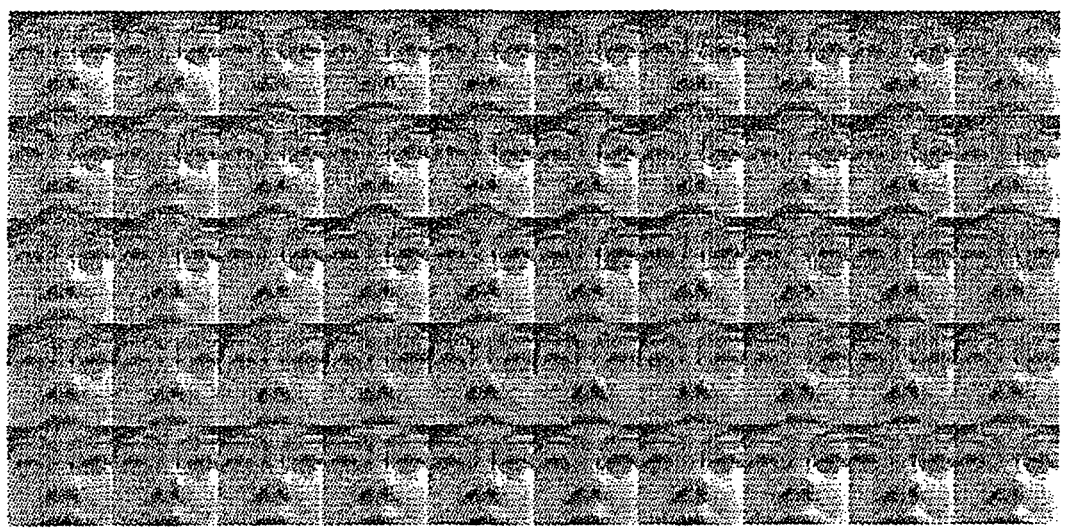
FEATURING VECTOR SET
K-L EXPANSION
EIGENVECTOR F I G. 5
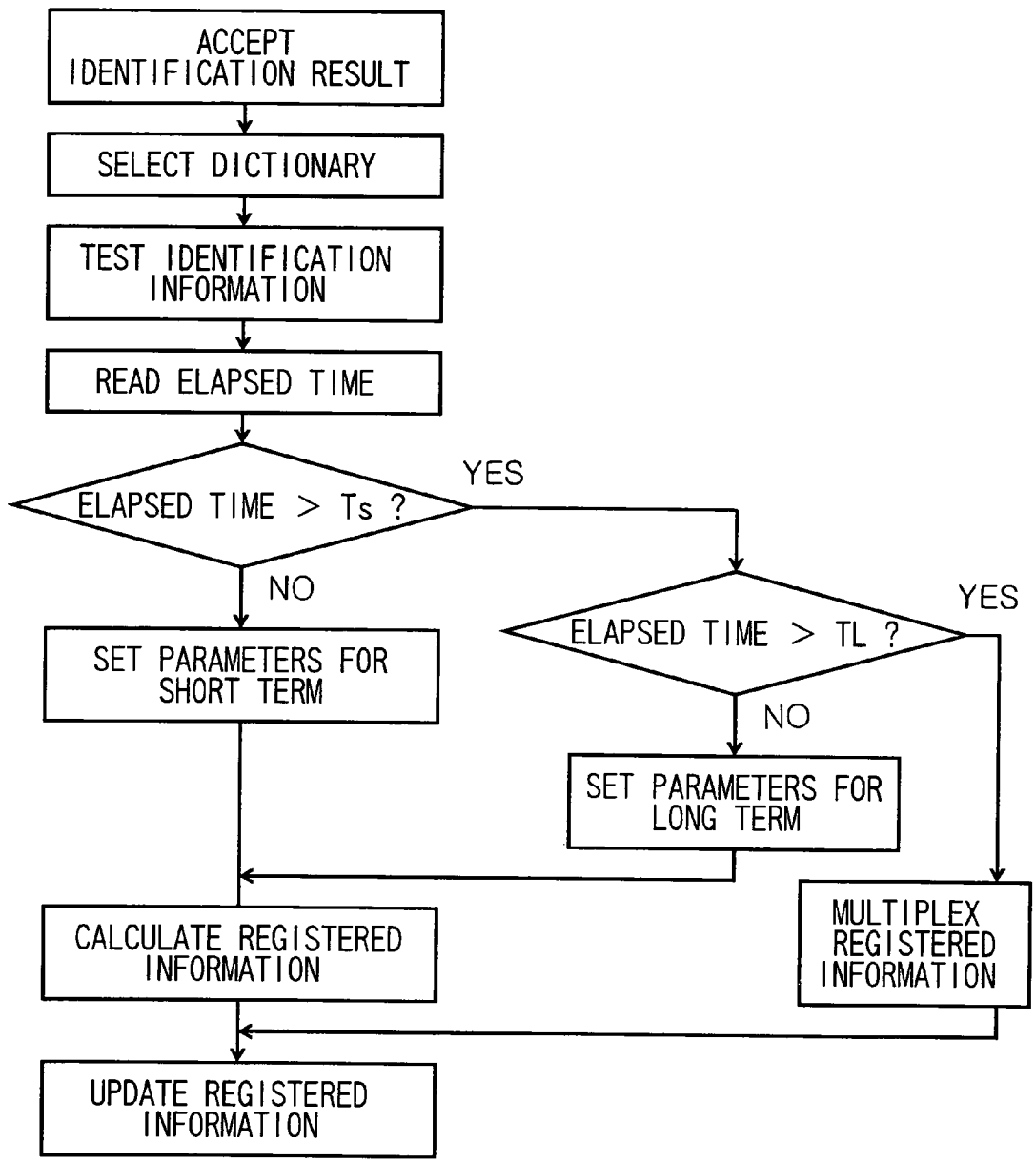

FACE RECOGNITION FOR AUTOMATIC ADJUSTMENT OF PERSONALIZED DEVICE PARAMETERS

CROSS-REFERENCE TO RELATED APPLICATIONS

This application is based upon and claims the benefit of priority from the prior Japanese Patent Application No. 2005-55149, filed on Feb. 28, 2005; the entire contents of which are incorporated herein by reference.

TECHNICAL FIELD

The present invention relates to a device control apparatus according to a personal identification, and a method therefor.

BACKGROUND OF THE INVENTION

In recent years, there has been raised an interest in the security such as the personal identification technique using biometrics. A personal identification method utilizing the biological information of a human being employs a face, a voiceprint, a fingerprint, an iris and so on. Among them, the technique employing the face is featured in that it can identify the person without any mental or physical burden and can be easily used. Moreover, the face image is the feature for the decision that is means for the human being to identify and discriminate in the various biometrics.

The face identifying technique finds its application not only for securities but also for improving the conveniences in the interface so that the personal identification technique is utilized for the system to match the user. However, most conventional proposals thus far made are conscious of the securities so that the "registering operations" and the "updating operations" explicitly occur. In order to configure more convenient interfaces, it is necessary to omit the explicit "registering operations" and "updating operations".

In Japanese Patent Application Publication (KOKAI) No. 2002-288670, there is a disclosure the setting of the state of a device, which is adjusted to a person in front of an electronic device. A device to set a seat by identifying the face of the driver of a vehicle is disclosed in Japanese Patent Application Publication (KOKAI) No. 2004-54580. These inventions have a function to register, in case the user cannot be specified, the user newly in a database. In Japanese Patent No. 3590285, on the other hand, there is disclosed a method in which when an unregistered passenger passes by, the passenger is newly registered in the database so as to identify the passenger.

However, several problems arise in case those automatic registrations are made.

(1) When the identification is mistaken, another person may be set, but this recovery method is not disclosed.

(2) In case the face identification is mistaken although the face has been registered, the person may be identified as a new person. However, this method has failed to tell the mistake to the system.

(3) In order to improve the precision for the face identification, the automatically updating method is needed. In case, however, the system identifies the person erroneously, a problem is that data of another person is mixed into that of a registered person.

(4) In the case of the automatic registration, one person may be doubly registered. This makes it necessary to integrate and discard the person's dictionary for maintenances. As a process for coping with the possibility that the identification is mistaken, Japanese Patent No. 3590285 discloses means for asking the person to confirm himself/herself. However, since this means is aimed at security application, it is an invention configured to deny the person based on the identification result, and therefore it does not suit for interface application.

In the system having the personal identification function which does not perform the registrations as the explicit operations, the invention has an object to simplify the confirmation of the identification result and to improve the conveniences for dictionary updating operations.

BRIEF SUMMARY OF THE INVENTION

According to embodiments of the invention, there is provided a device control apparatus which controls device environment parameters on the state or action of one or plural devices to be operated by the user. The device control apparatus comprises: an acquisition unit configured to acquire face identifying personal data from the face image of the user by inputting the face image; a registered information memory having personal dictionary data preregistered therein on the face image of one or plural persons and the personal data for a face identification; a face identification processor configured to identify a person matching the acquired personal data, by comparing the acquired personal data and the personal data in the registered personal dictionary data; an device environment information storage stored with the device environment parameters for every the registered persons; a display configured to display the face image, as matching the identified person, at the registration time on the basis of the registered personal dictionary data; interactive processor configured to receive from the user confirmation information to confirm whether or not the displayed person is identical to the user; and a device setting unit configured to call the device environment parameters matching the confirmed person, from the device environment information memory, thereby to set the device to device environment parameters.

According to the invention, a system, which does not perform the explicit registering operations but has a face recognizing function to register automatically, can be configured to have high conveniences by making the interactions with the user as simple as possible.

BRIEF DESCRIPTION OF THE DRAWINGS

FIG. 3 is a diagram showing a feature example;

FIG. 5 is a flow chart of a dictionary update;

DETAILED DESCRIPTION OF THE INVENTION

One embodiment of the invention is described in the following.

In this embodiment, an example of application of a device control apparatus 10 having an automatic registering function for a personal identification is described on an apparatus configured to identify the driver of an automobile to set the positions of devices 18 such as a courtesy mirror or a seat in accordance with the person.

Figure 1:
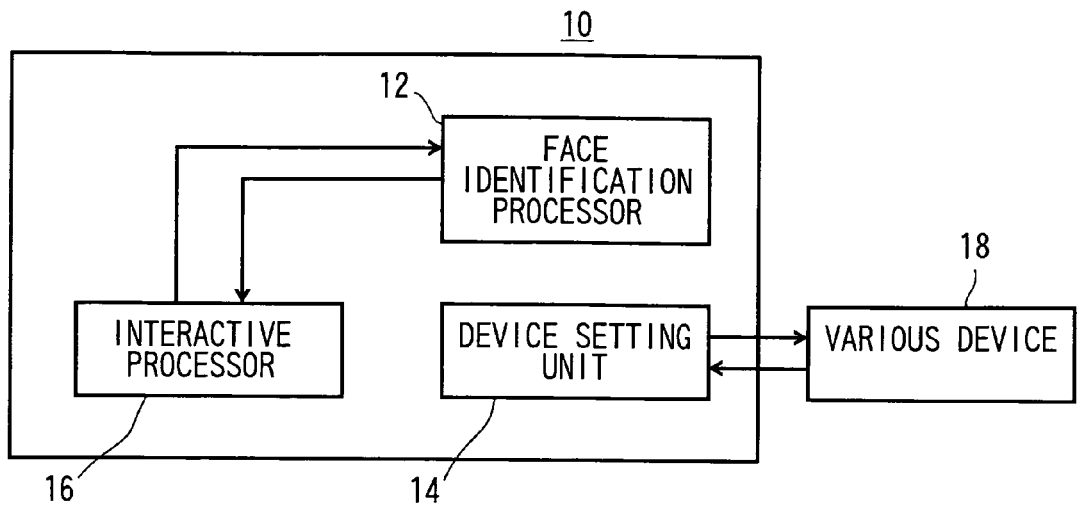
FIG. 1 is a block diagram of a device control apparatus of one embodiment of the invention.

As shown in the block diagram of FIG. 1, the device control apparatus 10 is configured to include a face identification processor 12, a device setting unit 14 and an interactive processor 16 and to control the positions of the various devices 18 such as the rearview mirror and the seat.

(1) Face Identification Processor 12

Figure 2:
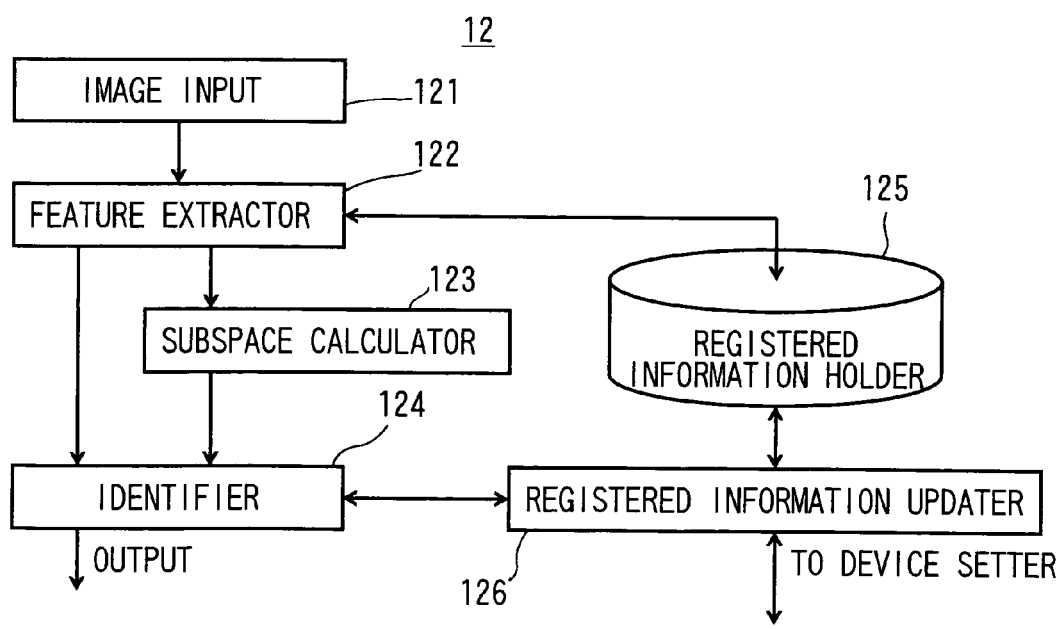
FIG. 2 is a block diagram of a face identification processor 12.

The face identification processor 12 is described. This face identification processor 12 is configured, as shown in the block diagram of FIG. 2, to include an image input 121, a feature extractor 122, a subspace calculator 123, an identifier 124, a registered information holder 125 and a registered information updater 126. The face identification processor 12 inputs a face image with a camera and processes the image. After this, the face identification processor 12 discriminates a person by using the similarity of the face pattern.

(1-1) Image Input 121

The image input 121 is configured to include an image inputting device such as a CCD camera to input the face image to a computer. This image input device is not limited in the number but may be composed of a plurality. The input image is digitized by an A/D conversion with an image input board and is stored in an image memory.

(1-2) Feature Extractor 122

This feature extractor 122 is configured to include a face area detector, a facial parts detector and a feature converter. The feature extractor 122 performs a face image analysis to determine the face area from the image inputted, and converts the analyzed image into feature for the identification.

(1-2-1) Face Area Detector

This face area detector detects a face area or a head area from the images stored in the image memory.

In the detection method of this embodiment, a correlation value is determined by moving a template prepared for the face detection in the image, to determine a place having the highest correlation value as the face area.

This calculation of the correlation value may be replaced by any method such as a face detector using the method, in which the distance or similarity is determined by making use of the Eigenface method or the subspace method and by extracting the place having the high similarity. In order to extract the face area from a head largely turned sideways, moreover, templates of faces in profile of several directions may also be prepared for use. The partial image containing the face area is sent to the face part detector.

(1-2-2) Facial Parts Detector

Next, the facial parts detector detects the facial parts such as eyes, a nose or a mouth. In this embodiment, the positions of the eyes and the nose are detected from the parts of the face area detected. The detecting method may be exemplified by the method disclosed by "Facial Feature Point Extraction Method Based on Combination of Shape Extractions and Pattern Matching" by Kazuhiro Fukui and Osamu Yamaguchi, Papers (D) of Association of Electronic Information Communications, vol. J80-D-II, No. 8, pp 2170-2177 (1997).

(1-2-3) Feature Converter

On the basis of the positions and the face areas detected, the feature converter slices the face area into predetermined sizes and shapes and uses their density information as the feature.

In the several face parts, combinations of two parts may be considered, and the segments joining the two facial parts featuring points may be confined at a predetermined ratio within the face area portions to be detected. In case the parts are not confined or in case the ratios to the parts positions do not satisfy the conditions, the rectangles are enlarged or reduced and are likewise converted into areas of m pixels×n pixels. The upper portion of FIG. 3 presents the face image data which are acquired in time series by processing the input image with the feature extractor 122.

In this embodiment, the information of m×n dimensions is used by using the density values of the individual pixels as the element information of feature vectors. The contents of these feature vectors should not be limited thereto but may be converted in various manners.

(1-3) Subspace Calculator 123

The subspace calculator 123 calculates the subspace by determining a correlation matrix (or a covariance matrix) of the feature vectors obtained at the feature extractor 122 thereby to determined orthonormal vectors (or eigenvectors) by a K-L expansion of the matrix. The subspace is expressed with a set of eigenvectors corresponding to eigenvalues, by selecting a k-number of eigenvectors in the order of the magnitudes of eigenvalues.

In this embodiment, the correlation matrix $C_d$ is determined as $C_d = \phi_d \Lambda_d \phi_d^T$ with the feature vectors thereby to determine a matrix $\phi_d$ of the eigenvectors.

FIG. 3 shows the face image data which is obtained by processing the input image with the feature extractor 122. The subspace is calculated by determining the correlation matrix of the feature vectors with those data and by determining the orthonormal vectors according to the K-L expansion. FIG. 3 visualizes and shows the eigenvectors.

This subspace is utilized as the discrimination dictionary to identify a person. This dictionary is the subspace which has been calculated from the input series at the time of an automatic registration, as will be described hereinafter. Alternatively, the subspace may be input data to discriminate itself. The calculation result at the subspace calculator 123 is sent to the identifier 124 and to the registered information holder 125.

(1-4) Identifier 124

Next, the identifier 124 is described.

The identifier 124 identifies the person taken in the camera, by comparing the registered data (ex. the subspace) stored in the registered information holder 125 and either the feature obtained by the feature extractor 122 or the subspace obtained by the subspace calculator 123.

In order to identify a person, it is sufficient to determine whose data the person is the most similar to, and the person to match the most similar data may be the identification result. As an identifying method, a subspace method, a composite similarity method and the like may be used when the information of the feature extractor is used.

The identifying method of this embodiment may use either the mutual subspace method disclosed by "Pattern-Matching Method Introducing Local Structure" by Ken-ichi Maeda and Sadakazu Watanabe, Papers (D) of Association of Electronic Information Communications, vol. J68-D, No. 3, pp 345-352 (1985), or the constrained mutual subspace method disclosed by "Face Recognition under Variable Lighting Condition with Constrained Mutual Subspace Method—Learning of Constraint Subspaces to Reduce Influences of Lighting Changes-" by Kazuhiro Fukui, Osamu Yamaguchi, Kaoru Suzuki and Ken-ichi Maeda, Papers D-11 of Association of Electronic Information Communications, vol. J82-D-II, No.

4, pp 613-620, 1999. In these methods, not only the preregistered data but also the input data are represented as the subspace, and the similarity is defined with the "angle" made between two subspaces.

For an input data row, a correlation matrix $C_{in}$ is likewise determined and is diagonalized into $\phi_{in}\Lambda\phi_{in}^T$ to determine an eigenvector $\phi_{in}$.

An inter-subspace similarity (0.0 to 1.0) of the subspace, as represented by two $\phi_{in}$ and $\phi_d$, is determined as a similarity for the identification.

In the case of the constrained mutual subspace method, the features effective for the identification are extracted by projecting the individual subspace in the constrained subspace, and the inter-subspace similarity is then determined.

Figure 4:
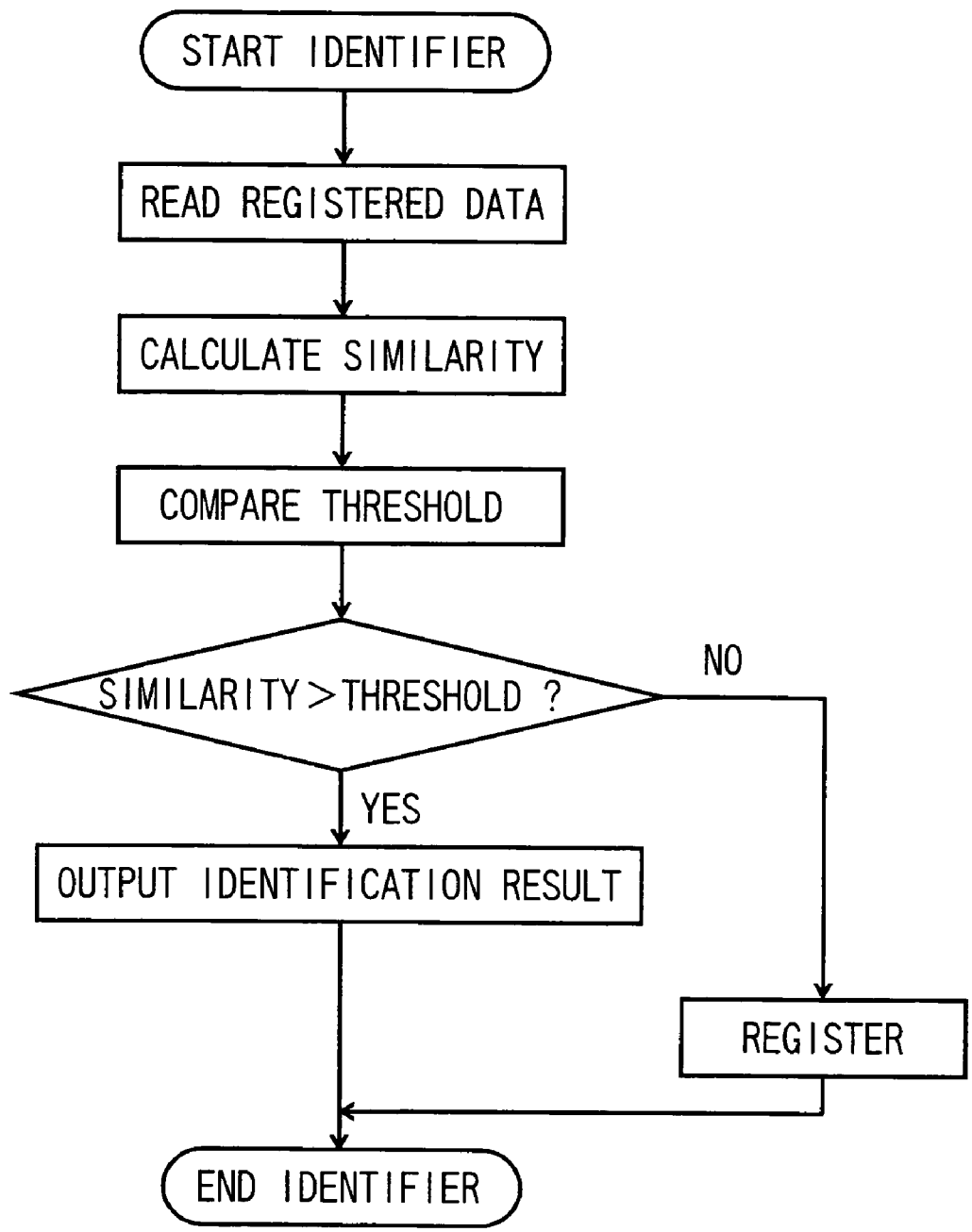
FIG. 4 is a flow chart of face identification.

The identifier 124 acts, as shown in FIG. 4.

The identifier 124 performs the identifications, and the registered information holder 125 reads all the registered data (or the subspaces) to be identified. The similarities to the individual pieces of registered information are determined by calculating the similarities to the input vectors or the input subspaces. Next, the maximum of the similarities calculated is selected and is outputted as the recognition result. The identification results are sorted in the order of similarities.

It is verified by making the threshold decisions of the similarities, as shown in FIG. 4, whether or the identification results are correct. In case the similarity is excessively low, for example, it can be decided not to belong to any identification object, and the registering work is done. This registering work is to send the input subspace to the registered information holder 125 and to store it as a personal dictionary.

The similarity and the decision result thus calculated are also sent to the registered information updater 126 and are utilized as the information for the updating.

(1-5) Registered Information Holder 125

The registered information holder 125 can store the subspace (or the correlation matrix) to be utilized to identify the person, and the situation information such as the time, date and place at the registration time. These may be the image input data or the extracted feature. This embodiment is described on the mode, in which not only the subspaces but also the correlation matrixes at the previous step of calculating the subspaces.

The registered information holder 125 holds one or more registration data for one person or an ID code. The subspace is stored together with the additional information such as the acquired time. Moreover, these pieces of information are newly created, changed or deleted by the instruction of the registered information updater 126.

(1-6) Registered Information Updater 126

The registered information updater 126 updates, if necessary, the registered data of the registered information holder 125.

One embodiment of this registered information updater 126 acts according to the flow chart shown in FIG. 5. At first, the result of the identification at the identifier 124 is accepted. Next, the information on which registered data was used for the identification is obtained from the registered information holder 125. As a result, it is obtained what similarity is to any registered data. The update of the registered information is described on that at the level of the correlation matrix. The correlation matrix of the registered information is designated by $C_r$, and the correlation matrix obtained with the input data is designated by $C_i$. Then, the correlation matrix is updated by summing the correlation matrixes of $C'_r=\alpha C_r+\beta C_i$, and the dictionary is updated by the K-L expansion of C'r. The parameters $\alpha$ and $\beta$ depend upon the time period for the collection, for example, and are used to change the weight.

Moreover, the registered information updater 126 also performs the actions to find out an overlapping dictionary from the registered information holder 125 and to consolidate the dictionary of the same person into one. In the case of an n-number of registered dictionaries, the similarity among the dictionaries is determined form (n−1) combinations by the mutual subspace method or the constrained mutual subspace method. In case the similarity exceeds a predetermined threshold, it is decided that the person is identical. The integration is done by summing two correlation matrixes of registered information $C_a$ and $C_b$ into one new correlation matrix $C'=C_a+C_b$.

(2) Device Setting Unit 14

Next, the device setting unit 14 is described. This device setting unit 14 accepts the result of the personal identification with the face, and controls the devices.

Figure 6:
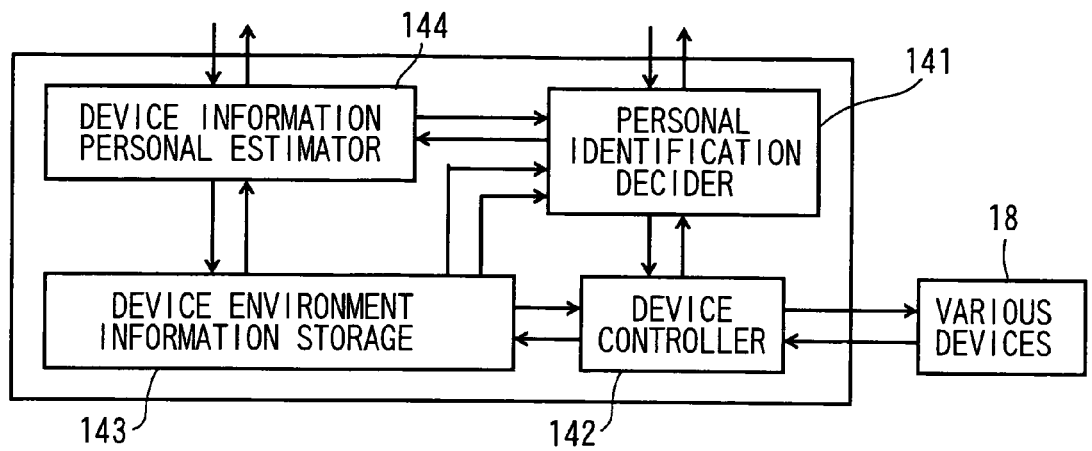
FIG. 6 is a block diagram of a device setting unit 14.

As shown in the block diagram of FIG. 6, the device setting unit 14 is configured to include a personal identification decider 141 to decide the result of personal identification, a device controller 142 to transmit/receive the information of a device, a device environment information storage 143 to store the parameter information of a device, as matches various persons, and a device information personal estimator 144 to estimate a person in accordance with the change in the state of the device.

(2-1) Personal Identification Decider 141

The personal identification decider 141 to decide the result of the personal identification accepts the result of the face image processor and decides the operations and processes on the various devices from the identification result. The personal identification decider 141 also decides the automatic registration of an unregistered person.

(2-2) Device Controller 142

The device controller 142 transmits the device environment parameters of the device environment information storage 143 to the individual actuators, and reads the values of the individual sensors thereby to transfer the information to detect the change in the states of the devices.

(2-3) Device Environment Information Storage 143

The device environment information storage 143 stores the individual device environment parameters matching the individual registered persons. In case the various device environment parameters vary, the database is updated.

(2-4) Device Information Personal Estimator 144

The device information personal estimator 144 compares the contents of the device environment information storage 143 and the prevailing states of the sensors of the various devices 18, for example, and outputs the ID of the person who matches the parameter set through to resemble the individual device environment parameters.

Here, the various devices 18 are exemplified by devices relating to the driving, such as the seat, the rearview mirror, the handle and the side mirrors of an automobile, and the internal apparatus such as the audio system or the cooler. These devices are equipped with various actuators or the like to be electronically controlled by the instructions from the device setting unit 14, and with encoders and sensors to sense the states of the various devices 18.

The device environment parameters are the setting parameters of the aforementioned various devices and are exemplified by parameters indicating the strokes of actions of the actuators attached to the various devices.

(3) Interactive Processor 16

Figure 7:
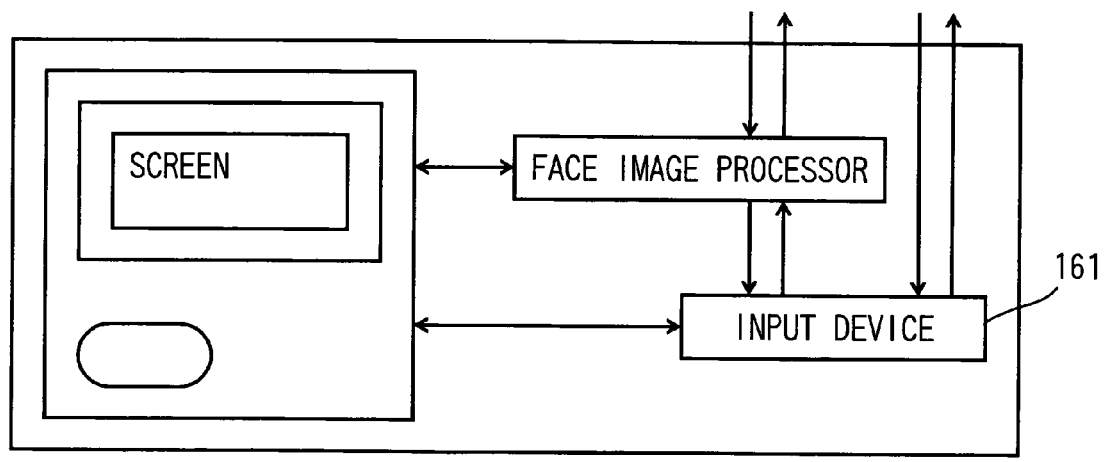
FIG. 7 is a block diagram of an interactive processor 16.

This interactive processor 16 is configured to include a screen to present the information of the system, an output device such as a speaker, and an input device such as a button, a microphone and a joy stick. As shown in FIG. 7, the interactive processor 16 further includes a face image processor 161 to receive the face image of the registered person from the face identification processor 12, and presents it on the output device in accordance with the situations.

(4) First Action Example

Figure 8:
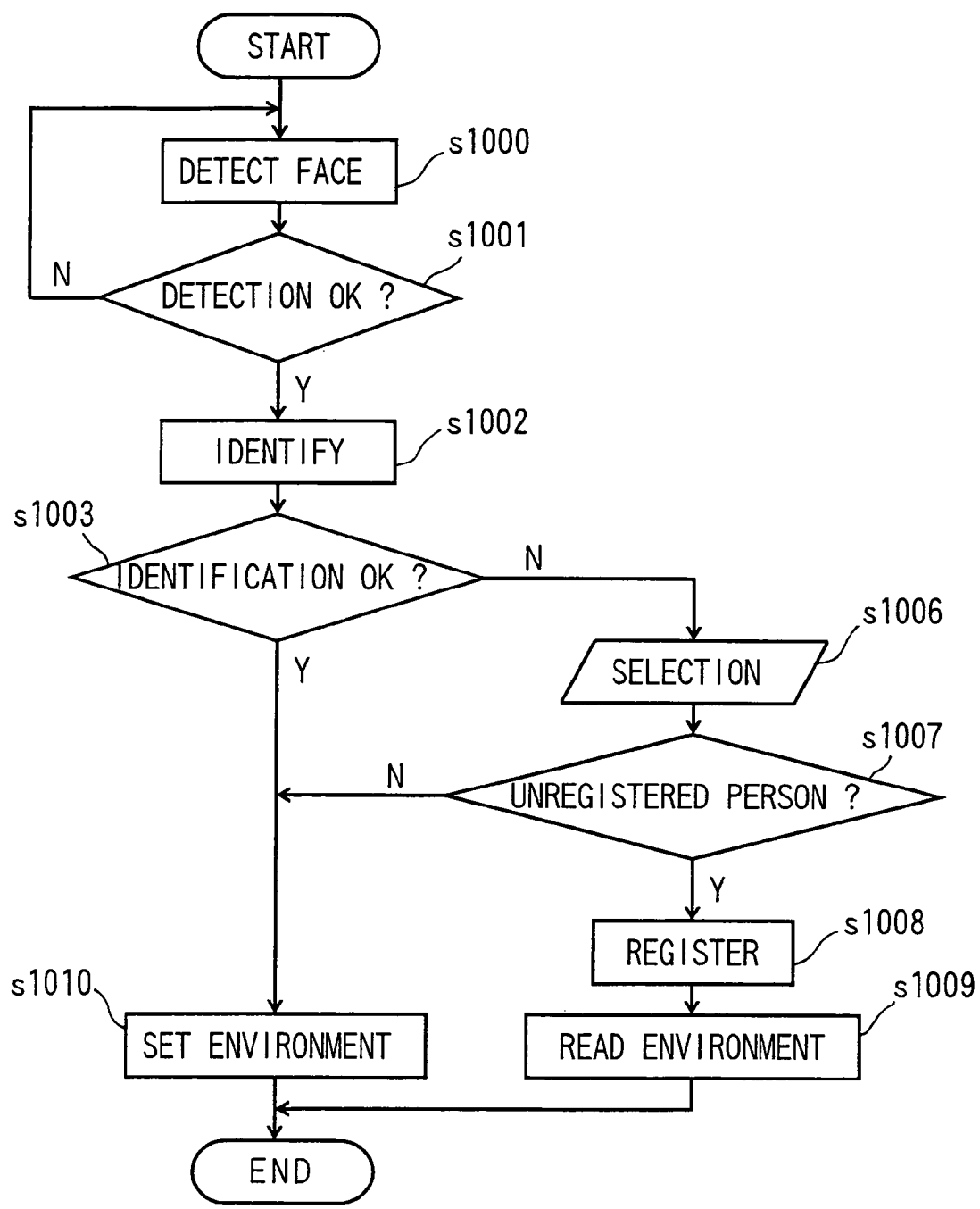
FIG. 8 is a flow chart of a device setting of a first operation example.

The flow chart of basic actions is described with reference to FIG. 8.

At first, a face detection is performed (at s1000) at the face identification processor 12. It is detected (at s1001) whether or not the face detection is possible, and an identification is done in case the face detection is made. In case the face detection is impossible, the operation is repeated till the detection. An identification (at s1002) is performed, as described with reference to FIG. 4.

At the personal identification decider 141 having accepted the identification result, it is decided (at s1003) whether the person is registered. In the case of the registered person, the registered environment is set (at s1010).

In case the similarity to all the registered persons is lower than a set threshold, it is decided that the person does not belong to the registered one. At this time, the confirmation is asked for the driver (at s1006). The decision of the unregistered person is divided into two cases, in which the driver is really the unregistered person and in which the driver is registered but is mistaken as the unregistered person because the similarity does not exceed the threshold.

The confirmation is made by inquiring through the interactive processor 16 whether or not the person is registered. In the interactive processor 16, there are displayed the registered photograph and the unregistered icon of the person who has the highest similarity. When the driver is the unregistered person, it is inputted that the driver is the unregistered person. In case the decision of the unregistered person is fixed (at s1007), the person is registered (at s1008), if unregistered. In the registering process, the input data is converted into the registered one, and the taken face image is acquired and used for the display. The device environment parameters or the preceding ones are stored (at s1009) in the device environment information storage 143. In the case of the registered person, the device environment parameters of the selected person are called from the device environment information storage 143, and the instruction to set the various devices is issued to the device controller 142 thereby to set the environment (at s1010).

(5) Second Action Example

In case the system mistakes the person in the identification of the first action example, the following problems occur.

The first problem is that the person is misjudged as another so that the different environment is set. In the case of setting the seat, for example, the seat is set at an absolutely different position.

In the second problem, if the decision is left as the different person, the data of another person is mixed by the updating process. In order to avoid this, the confirmation is made, too, after the identification.

Figure 9:
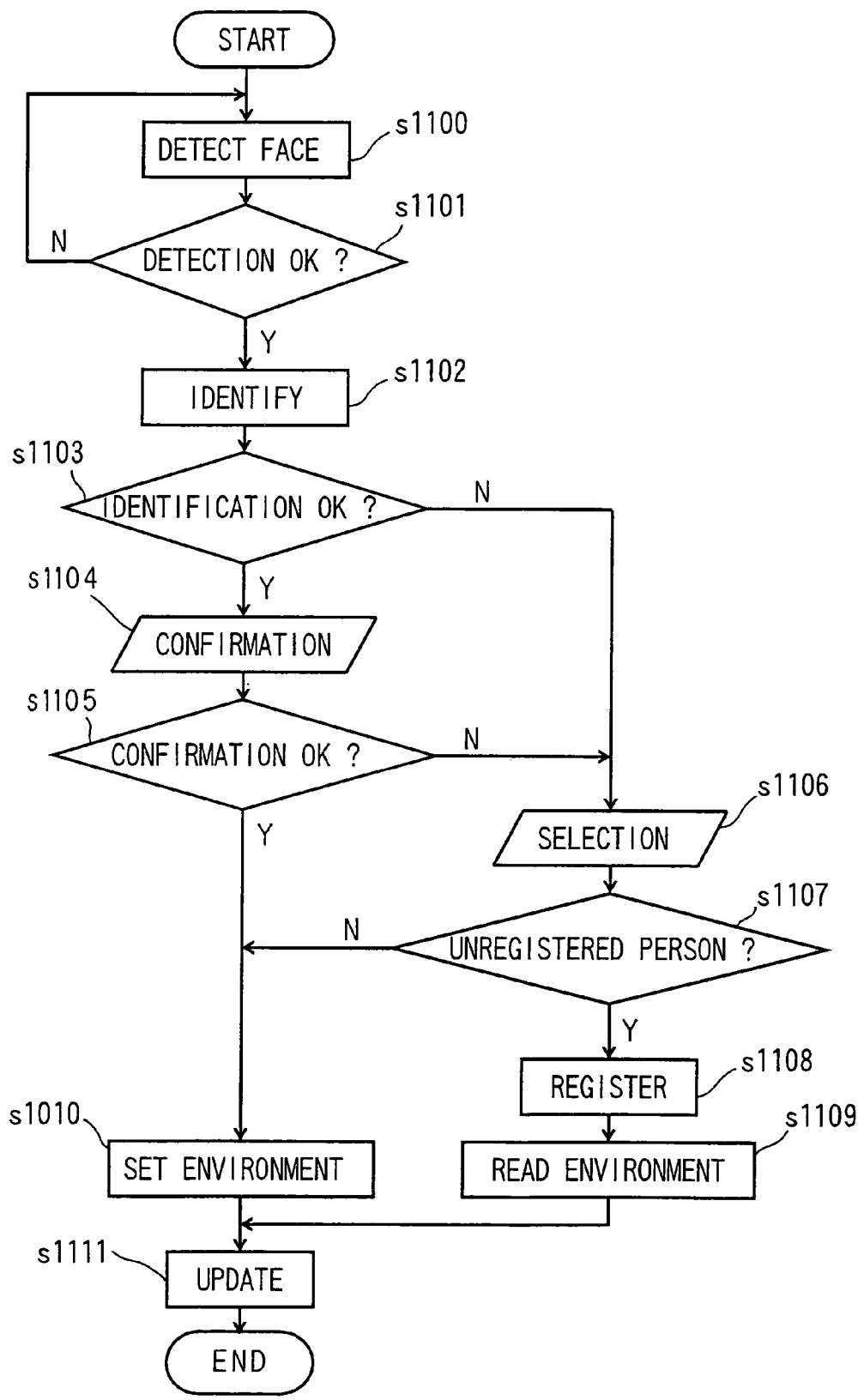
FIG. 9 is a flow chart of the device setting of a second operation example.

The second action example is described with reference to the flow chart of FIG. 9.

As in the first action example, the face detection is made (at s1100) in the face identification processor 12. It is decided (at s1101) whether or not the face detection is possible. In case the face detection is made, an identification is performed (at s1102). It is decided (at s1103) whether or not the person is registered. In the case of the registered person, the confirmation is made on the driver (at s1104). In the case of the confirmation on the driver, it is necessary to show the driver what person the system has identified. At the registration time, however, the name is neither registered nor is indicated the ID number. For the confirmation by the driver, therefore, the face image at the registration time (i.e., when the system is used at the first time) is merely displayed and can tell to the driver.

The unit to inquire it by displaying the face image at the registration time whether the registered person is correct is exemplified by the interactive processor 16. For example, the face image is displayed in the screen of a car navigation system, for example, it is confirmed whether the displayed person is identical to the driver, and the answer is made by Yes/No. In case it is confirmed that the driver is the registered person, the registered environment is set (at s1110). In case the decision of the registered person is not made, too, the confirmation is made on the driver (at s1106). In the case of the person other than the registered one, it is decided (at s1107) whether the person is unregistered. In the case of the unregistered person, the registration is made (at s1108). Then, the prevailing device environment parameters are stored (at s1109) in the device environment information storage 143. In case the person is confirmed or just after the registration, the person is less interchanged so that the updating process is done. In case the change in the person occurs in mid-stream, the updating process is interrupted.

(6) Third Action Example

In the cases of the first action example and the second action example, the same person may be duplicated, although confirmed, when the automatic registration is made. This makes necessary the maintenance such as the integration or destruction of the personal dictionary by the user. In this embodiment, the automation (or integration process) of that work is described. Here, this duplicated indicates that the registration of a person has already been made so that it is made after the confirmation that the person is unregistered.

If the integration is then checked at the registration time to require the integration, this integration is postponed, because some driver may desire a different environment setting (e.g., the driver may own two kinds of setting according to the situations), after the state of once registration so that a plurality of registration states are established just before the engine is stopped or when the engine is started.

Figure 10:
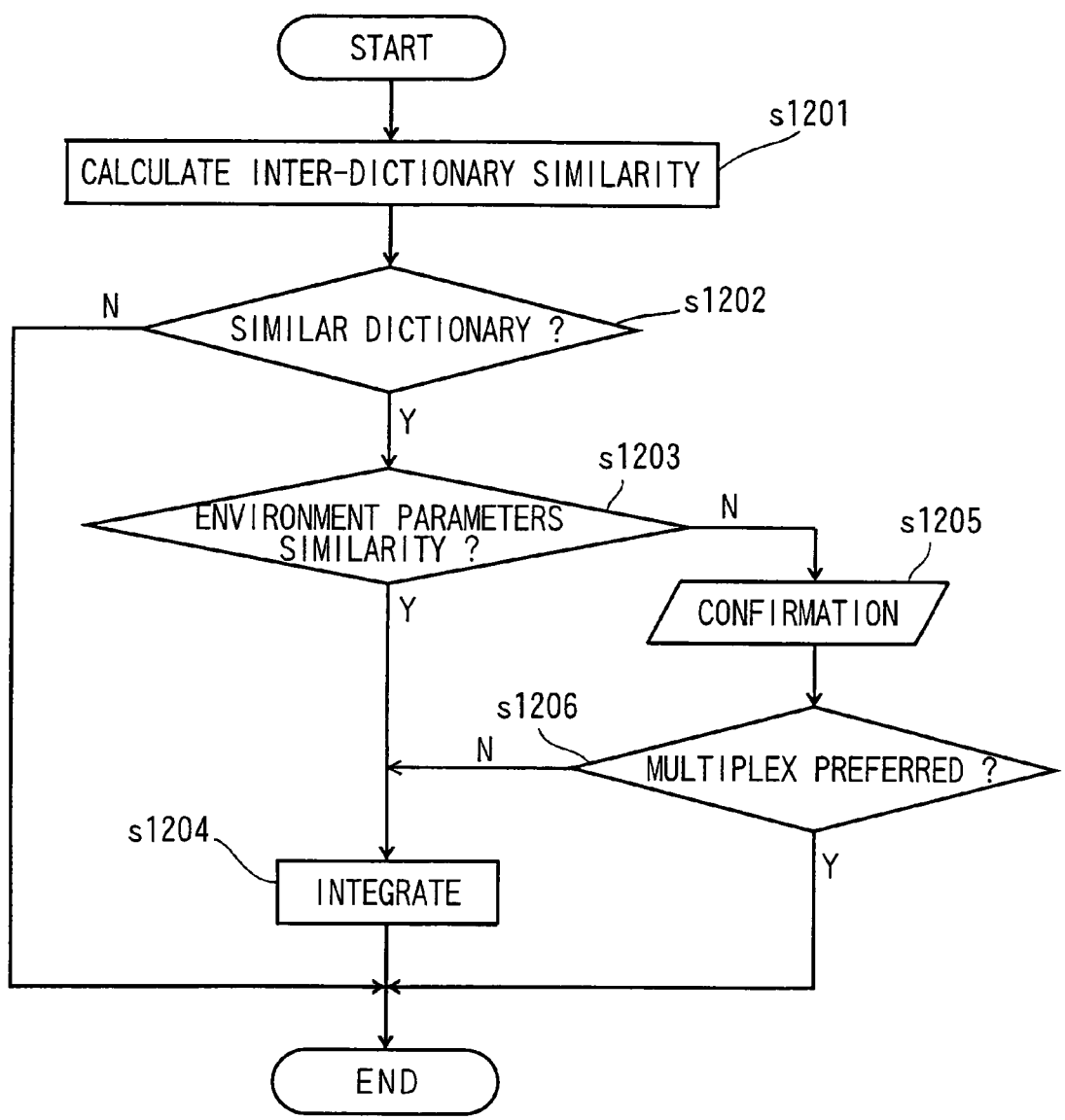
FIG. 10 is a flow chart of an automatic dictionary integration of a third operation example.

The integration is described with reference to FIG. 10.

At first, in order to decide the similarities of all personal dictionaries, the similarities among the dictionaries are determined (at s1201) for all the combinations of personal dictionaries by the mutual subspace method and by the constrained mutual subspace method. It is decided with a predetermined threshold (at s1202) whether or not a combination of a high similarity is. In case this answer is Yes, the similarities of device environment parameters are compared (at s1203). In case the device environment parameters are also similar, it is highly probable that the person is identical. Therefore, the integration is made (at s1204). In case the device environment parameters are not similar, the confirmation is made to make it rely on the decision of the driver (at s1205) whether or not the persons of two dictionaries are identical. If multiplex settings are admitted (that is, in case two or more settings are desired), the integration is not made. In case the decision is made not to multiplex but to integrate, the two dictionaries are integrated (at s1204).

Here, the integration of dictionaries is done in the registration updater of the face identification processor 12 so that the dictionaries of the registration holder are integrated. Accordingly, the corresponding device environment parameters are selected for the identical person and are stored again in the device environment information storage 143.

(7) Fourth Action Example

In addition to the action examples thus far described, here is described the method to sense the state of the device 18 to make use of the device environment parameters.

In order to make the selections more convenient at the confirming actions such as those of the second action example, it is advisable to restrict the number of selectable persons. In case the setting of the device 18 is manually changed, the person is focused by retrieving the device environment parameters changed, from the database.

In a specific case, in which the face identification fails, that is, in which the set threshold is not exceeded, it is conceived to operate a certain device 18 manually. Although the device 18 is usually set in the desired state if the identification succeeds, the face identification fails, so that the system causes no action while awaiting the confirmation of the unregistered person or the mistaken identification.

Therefore, the user operates a device 18 connected with the device setting unit 14 without operating the interactive processor 16. In the case of the automobile, for example, it is considered that the face identification fails with the resultant movement of the rearview mirror. It is assumed that the parameter of the encoder indicating the direction of the rearview mirror is changed from Rd0 to Rd1. Therefore, the device information personal estimator 144 extracts the device environment parameter of the rearview mirror having a value close to Rd1, from the environment setting database of the device environment information storage 143. It is, then, sufficient to present it only as a choice of alternatives whether or not the parameters belong to those of the extracted person. For this presentation, when the identification result is indefinite, the person can be estimated from the setting information of the device 18. This information is useful as that to take the confirmation.

Thus, the estimation results by the operations of the individual devices 18 can be utilized in place of the responses at the interactive processor 16. Moreover, the processing can be made at a higher speed, if the estimation results by the operations of the individual devices 18 are sent to the face identification processor 12 so that only the selected ones are identified.

(8) Modifications

The invention should not be limited to the individual embodiments thus far described but can be modified in various manners so long as the modifications do not deviate the gist of the invention.

For example, the foregoing embodiments have been described on the face identification and the device control in the automobile, but may also be applied to the operations of other vehicles or electronic devices. The invention can also be applied to a robot or the like having a function to register personal information automatically.

What is claimed is:

1. An apparatus for setting a device configuration parameter of setting a device:
    an image inputting unit configured to input a face image of the user;
    an extracting unit configured to extract personal feature data from the face image;
    a dictionary storage configured to store personal dictionary data of one or a plurality of registered persons, the personal dictionary data including a face image and a dictionary feature data of the each registered person;
    a face identification processor configured to identify a person matching the personal feature data, by comparing the personal feature data and the personal dictionary data of the each registered person;
    a device configuration parameter storage configured to store a device configuration parameter of the device for the each registered person;
    a display configured to display the face image of the identified person stored in the dictionary storage;
    an interactive processor configured to receive, from the user, confirmation information to confirm whether or not the displayed face image is identical to the user; and a device setting unit configured to set, to the device, the device configuration parameter of the confirmed person stored in the device configuration parameter storage;
    an integration unit that is configured:
        to obtain a similarity between plural ones of the personal dictionary data stored in the dictionary storage;
        to call the device configuration parameters corresponding to the plural ones of personal dictionary data having the similarity higher than a threshold, from the device configuration parameter storage;
        to compare similarities between the called device configuration parameters; and
        to integrate said plural ones of the personal dictionary data with each other when the similarities between the called device configuration parameters are higher than a threshold.

2. An apparatus for setting a device configuration parameter of setting a device:
    an image inputting unit configured to input a face image of the user;
    an extracting unit configured to extract personal feature data from the face image;
    a dictionary storage configured to store personal dictionary data of one or a plurality of registered persons, the personal dictionary data including a face image and a dictionary feature data of the each registered person;
    a face identification processor configured to identify a person matching the personal feature data, by comparing the personal feature data and the personal dictionary data of the each registered person;
    a device configuration parameter storage configured to store a device configuration parameter of the device for the each registered person;
    a display configured to display the face image of the identified person stored in the dictionary storage;
    an interactive processor configured to receive, from the user, confirmation information to confirm whether or not the displayed face image is identical to the user; and
    a device setting unit configured to set, to the device, the device configuration parameter of the confirmed person stored in the device configuration parameter storage;
    a person estimating unit configured to detect modification of the device configuration parameter by operation of the device by the user, and to estimate a person corresponding to the modified device configuration parameter from the registered person on basis of data on the device configuration parameter storage; and
    wherein said display is further configured to display the face image of the estimated person, which is stored in the dictionary storage.

3. An apparatus for setting a device configuration parameter of setting a device:
- an image inputting unit configured to input a face image of the user;
- an extracting unit configured to extract personal feature data from the face image;
- a dictionary storage configured to store personal dictionary data of one or a plurality of registered persons, the personal dictionary data including a face image and a dictionary feature data of the each registered person;
- a face identification processor configured to identify a person matching the personal feature data, by comparing the personal feature data and the personal dictionary data of the each registered person;
- a device configuration parameter storage configured to store a device configuration parameter of the device for the each registered person;
- a display configured to display the face image of the identified person stored in the dictionary storage;
- an interactive processor configured to receive, from the user, confirmation information to confirm whether or not the displayed face image is identical to the user; and a device setting unit configured to set, to the device, the device configuration parameter of the confirmed person stored in the device configuration parameter storage;
- a person estimating unit configured to detect modification of the device configuration parameter by operation of the device by the user, and to estimate a person corresponding to the modified device configuration parameter from the registered person on basis of data on the device configuration parameter storage; and
- wherein the face identification processor identifies using the personal dictionary data of the estimated person.

* * * * *